United States Patent [19]
Minardi

[11] Patent Number: 5,881,785
[45] Date of Patent: Mar. 16, 1999

[54] PIVOTED FENCE WITH LOCATING POST

[76] Inventor: John E. Minardi, 4163 Braewick Cir., Kettering, Ohio 45440-1405

[21] Appl. No.: 966,628

[22] Filed: Nov. 10, 1997

[51] Int. Cl.$^6$ ....................................................... B27B 5/02
[52] U.S. Cl. .................................... 144/253.2; 144/135.2; 144/253.1
[58] Field of Search ............................. 144/134.1, 135.2, 144/1.1, 253.1, 253.2, 253.7, 286.1, 286.5; 33/628, 638, 640, 643; 269/303, 315; 409/212

[56] References Cited

U.S. PATENT DOCUMENTS 5,423,360  6/1995  Taylor et al. .......................... 144/253.1

*Primary Examiner*—W. Donald Bray
*Attorney, Agent, or Firm*—Joseph G. Nauman

[57] ABSTRACT

A router and other cutting tools with a fixed center such as drills, shapers, milling machines, etc., used for cutting wood, metal or other materials, is provided with a fence mechanism for either a table or the base of a portable tool, for rapid and easy settings of the fence with respect to the center of the cutting tool. This is accomplished by a pivot mounting of the fence on a table or on a portable tool base, with respect to a block pivoted to the table or tool base, wherein the center of the pivot for the block and the center for the pivot for the fence are on opposite sides of the cutting tool and located on a line which passes through the tool center and the respective pivot locations. The desired spacing of the fence to the tool can be achieved using accurate spacers between the fence and the block, even with the tool being mounted in place. When used on a table, a curved slot in the table top, of predetermined shape and location with respect to the tool center, can be provided to receive a follower pin extending from the fence and function to move the fence in fence centered motion. The disclosure teaches how to develop such a curved guiding slot.

11 Claims, 9 Drawing Sheets

PIVOTED FENCE WITH LOCATING POST

BACKGROUND OF THE INVENTION

The concept of using two pins or posts mounted on a router base to make a self-centering mortising and slotting base is per se well known. Spielman in his book "Router Jigs & Techniques" (1988 Sterling Publishing Co., Inc. New York N.Y.) describes such a base on page 202. A more recent application of the concept is described by Taylor and McDaniel in U.S. Pat. No. 5,423,360 where an apparatus for centering a work-piece relative to a cutting tool is disclosed. That concept could be adapted directly to a router table T, with a router (not shown) mounted to a base plate 14 (or a table for other tools such as drills, shapers etc.) as illustrated in FIG. 1 herein (Prior Art).

Thus, two posts 13a and 13b could be fixed to a table with pivots 12a and 12b, the posts being centered on each side of the cutting tool on a line through the center of the cutting tool 15. The posts could be, for example, four inch diameter disks cut from three-quarter inch stock. Although the arrangement illustrated in FIG. 1 could work for centering a work-piece it would be difficult to use and not truly practical. However, with certain unique modifications described hereinafter, such a device can be very useful not only for centering the workpiece but also in setting up the fence of a router table to perform various cuts.

SUMMARY OF THE INVENTION

Even though a router table is used as an example, it is clear that the concept can be used with various other cutting tools with a fixed center such as drills, shapers, milling machines, etc., whether used for cutting wood, metal or other materials. The most important unique feature of this invention is the provision of a fence mechanism, for either a table or a portable tool, which provides rapid, easy to use, settings of the fence with respect to the center of a cutting tool, such as a router bit. This is accomplished by a pivot mounting of the fence on a table or on a portable tool base, with respect to a block pivoted to the table or tool base, wherein the center of the pivot for the block and the center for the pivot for the fence are on opposite sides of the cutting tool and located on a line which passes through the tool center and the respective pivot locations. The desired spacing of the fence to the tool can be achieved using accurate spacers between the fence and the block, even with the tool being mounted in place.

When the invention is installed on a table, a curved slot of predetermined shape and location with respect to the tool center will receive a follower pin extending from the fence, and provides a means for positioning the fence to provide fence centered motion such that when the fence is moved over the table the center of the fence will always align with the center of the cutting tool (i.e. the center of the fence and the center of the cutting tool lie on a line perpendicular to the fence.) The disclosure teaches how to develop such a curved guiding slot.

Also disclosed are various jigs and relationships which can be used to locate desired centers of pivot locations on the table, or on a tool baseplate.

DESCRIPTION OF THE PREFERRED EMBODIMENTS

Figure 1:
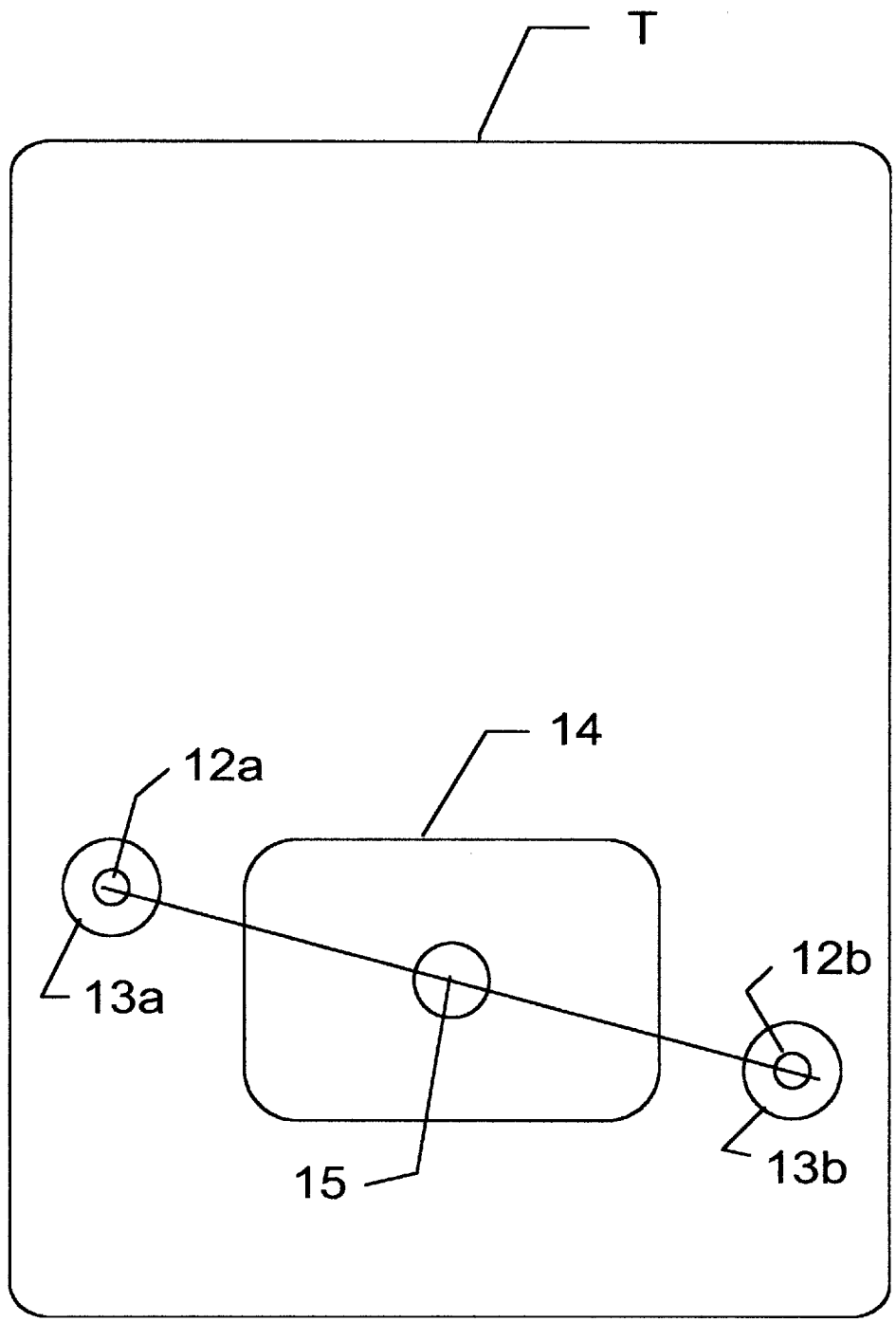
FIG. 1 (prior art) shows two posts pivotally attached to a table and equally spaced from a cutting tool on a line extending through the tool center.
Figure 2:
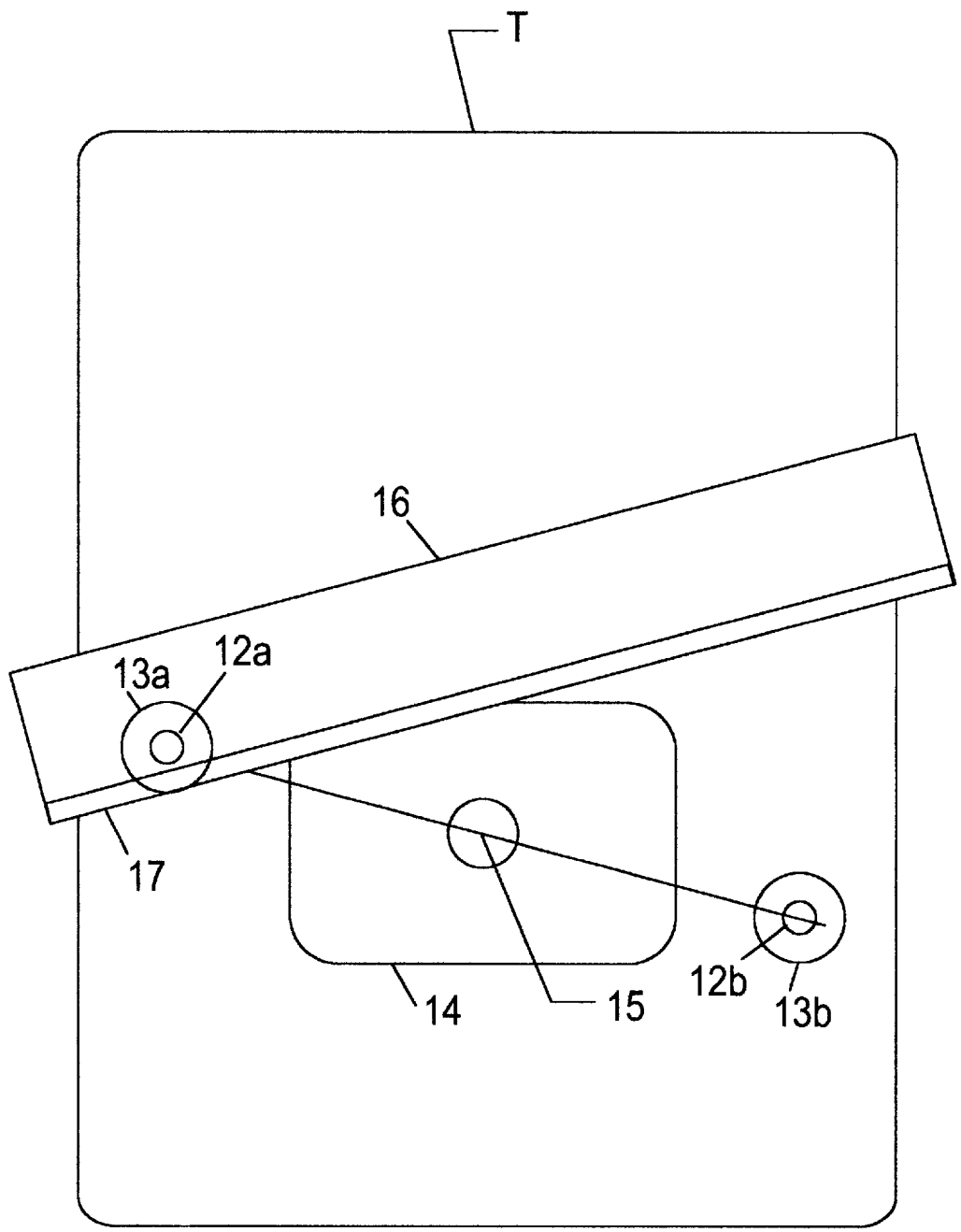
FIG. 2 shows the post arrangement of FIG. 1 together with a fence pivotally attached to the table.

As illustrated in FIG. 2, the router fence can be attached to the left-hand post 13a so its face is tangent to the post as shown. The left hand post 13a does not need to be present; all that is required is that the fence 16 be attached to the table by a pivot 12 located at the center of the original post 13a. The pivot hole in the fence 16 is located relative to the face 17 of the fence at a distance equal to the radius of the post 13b, e.g. 2 inches for the 4 inch diameter post in the example. With this arrangement, the left-hand post is replaced by the fence 16 and pivot 12a. In a similarly way, the right hand circular locating post 13b in FIG. 2 could be replaced with a rectangular locating post, provided that the edge facing the fence is tangent to the original circular locating post 13b.

If a board (i.e. work-piece) is placed against the fence face 17 and both are rotated until the work-piece contacts the locating post, then the board is perfectly centered relative to the cutting tool regardless of the thickness or width of the board. The fence 16 can then be clamped to the table T, the locating post 13b removed and, if desired, stop blocks positioned on the fence 16. The fence 16 can then be used to make the desired, centered cuts in as many pieces of the same size as required.

In order to ensure accuracy over time, means can be provided to adjust the position of one of the pivots 12a and 12b. Using a simple jig, the table could be realigned, e.g. after a new router is installed in the table.

The automatic centering feature in itself would make the pivoted fence with locating post worth while, however, it is also very simple to accurately set up other jobs, that do not require centering.

The pivoted fence with locating post is exactly the same as any other pivoted fence when the locating post 13b is removed. In most applications, the fence face 17 is located behind the center of the cutting tool 15, but for some applications the fence face 17 is in front of the center of the cutting tool 15. However, when the fence 17 is behind the cutting tool, the pivoted fence with locating post is easy to set up for various cuts and will be discussed first.

Figure 3:
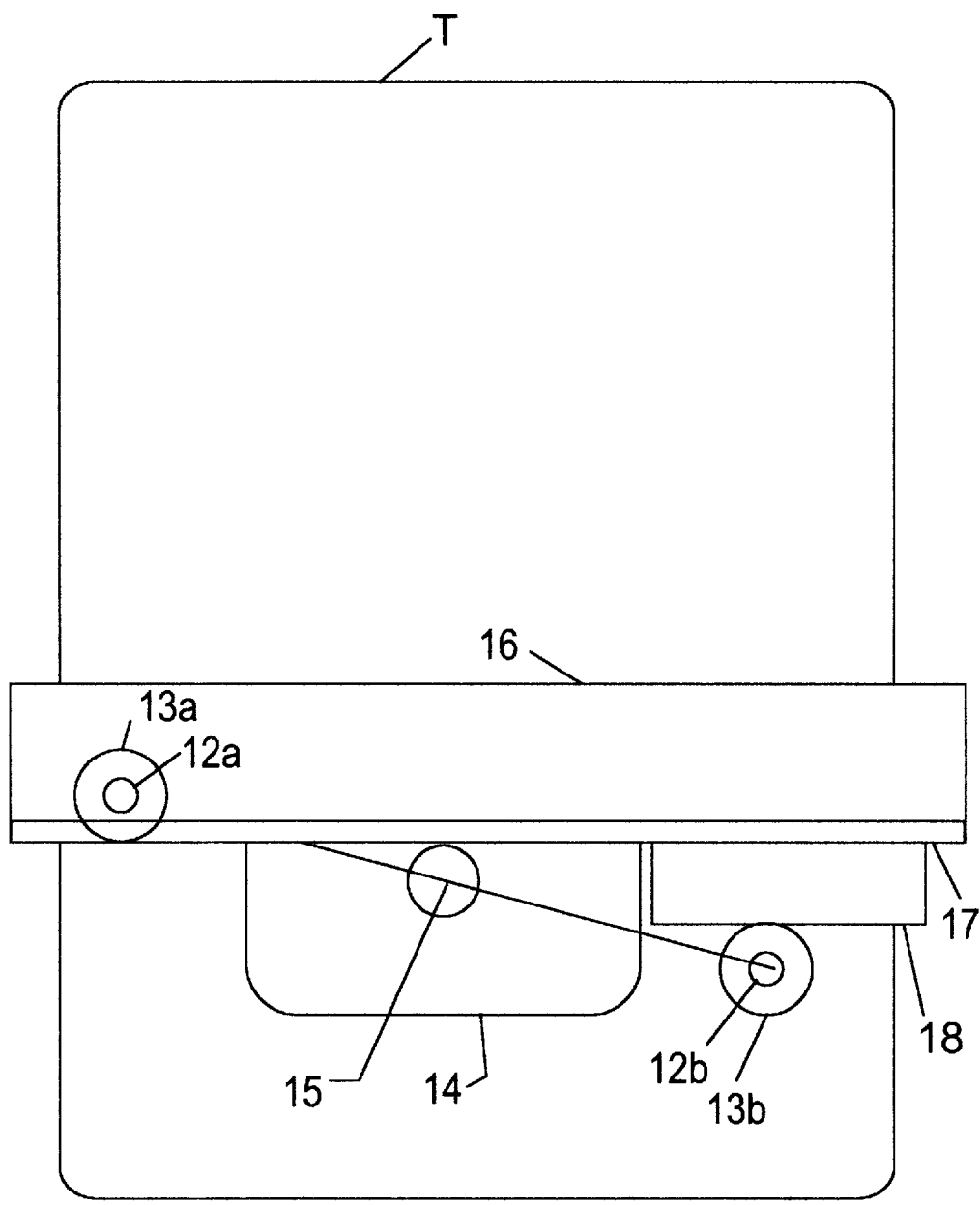
FIG. 3 illustrates the use of a spacer of known dimension to space the fence a desired distance from the cutting toll.

The pivoted fence with locating post can be used to accurately set the fence face 17 a required distance from the center of the cutting tool very easily. As shown on FIG. 3, all that is required is a spacer 18 of twice the desired setting: e.g. if you want the center of the cutting tool 15 to be ³⁄₁₆ inch from the edge of the work piece, then use a ⅜ inch spacer 18 between the fence face 17 and the locating post 13b. Most well equipped shops have very accurate spacers available in drill bits, and can be used, as shown in FIG. 3, to accurately set up the fence. If no spacer 18 of the right size is available, then measurements can be made with a square or other suitable means.

One edge of the square must be against the fence face 17 and the other along a diameter of the locating post pivot 12b. The measurement, of course, is twice the required spacing at the bit center B from the fence face 17. If the rectangular locating post is used, the edge facing the fence face must be parallel to the fence when the measurement is made; this is easily accomplished with a square. However, a better option is to attach or build into the locating post a means for making accurate measurements, for example a vernier caliper or an Incra gauge.

If the fence face 17 is rotated against the left locating post 13b (i.e. no spacer), then the face of the fence is exactly over the center of the cutting tool 15. If it is desired to set the fence face 17 ahead of the cutting tool, a slightly more complicated approach is required as described hereinafter.

If it is desired to set the fence face 17 to a known distance ahead of the cutting tool center 15 or to reference the set up distance to the front of the cutting tool, smaller locating posts of known radius can be used to set up the fence 16. The distance that the fence face 17 is advanced ahead of the cutting tool center is one-half of the difference between the smaller radius and the original locating post radius. Thus, if the original locating post has a radius of two inches, and the new locating post has a radius of one & one-half inches, then the face of the fence face 17 is one quarter inch ahead of the cutting tool center 15 (i.e. ¼=(2−1.5)/2) which would also allow set up distances to be from the front edge of a ½ inch bit. Again, it is also possible to use a square and measure to the required small radius.

If a rectangular locating post is used, the pivot can be located so that the first edge is set to the same distance from its pivot as the fence face 17 is located from the fence pivot 12a, while each of the other three edges is set closer to the pivot at different distances. Hence, each edge can be used to set the fence face 17 ahead of the cutting tool center 15 by different amounts. Each edge can be set to measure the set up distance from the edge of different size cutting tools.

For completeness, the next section shows how the pivoted fence and locating post works and gives the information needed to make a fence with a ratio different than ½.

Function of the Pivoted Fence & Locating Post

Figure 4:
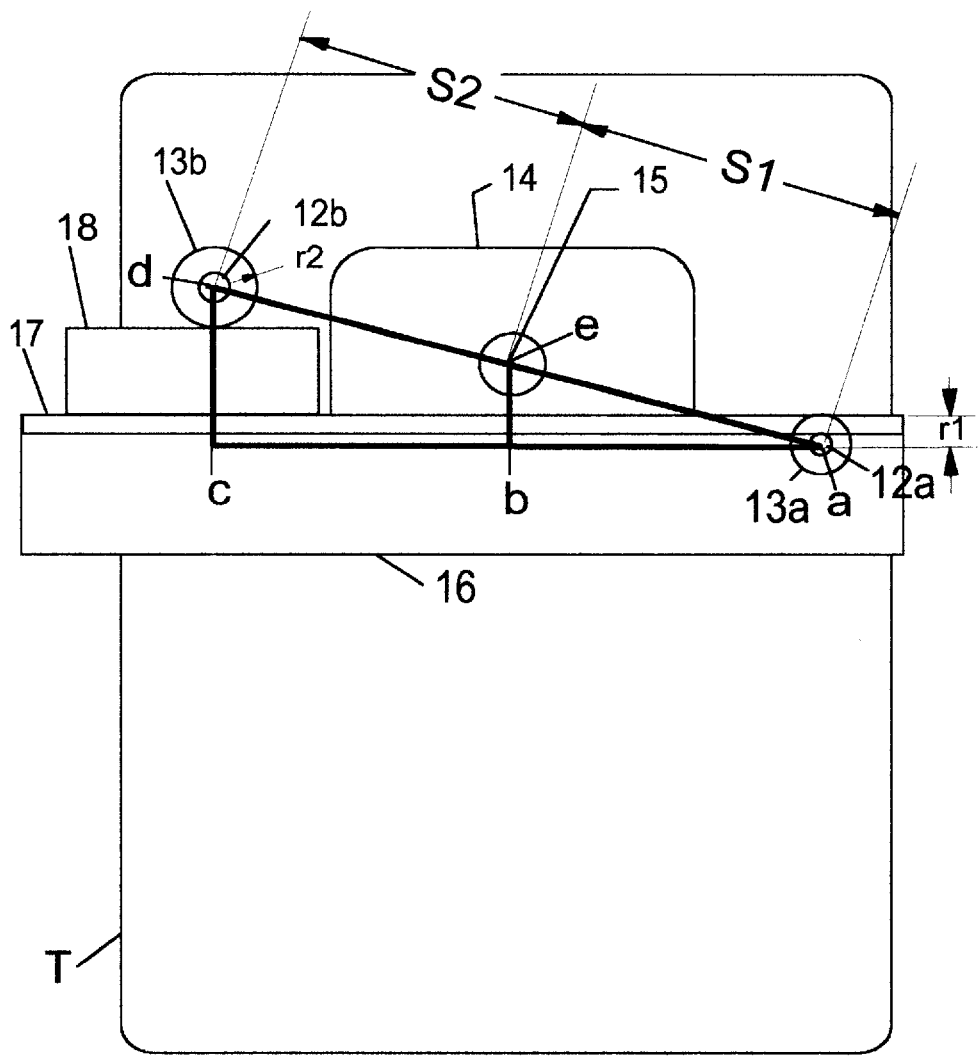
FIG. 4 is a view, from the back of table T, similar to FIG. 3 with exemplary dimensional relationships.

FIG. 4 shows a general scheme for setting up a pivoted fence and locating post. In general the centers of the locating post 13b, pivot 13a and cutting tool 15 must all lie on the same line but the spacing 51 and 52, need not be the same. That is, $S_1$ and $S_2$ do not need to be equal. The distance from the face of the fence to the pivot is $r_1$ and, in general, it does not need to be equal to the radius of the locating post r2.

Even with these generalizations, the similar triangles, shown bold in FIG. 4, can be used to describe how the pivoted fence and locating post works. The triangle "acd" is similar to the triangle "abe" and all of the similar sides are in the ratio of $S_1/(S_1+S_2)$ which is called R; note that if $S_1=S_2$ then the ratio, R, is ½ as it was in the previous discussion.

The sides "eb" and "cd" are similar sides and, therefore are in the ratio R. The side "eb" is the sum of $r_1$ and the set-up distance (the perpendicular distance from the fence face 17 to the cutting tool center 15). The side "cd" is the sum of $r_1$, the spacer 18 (or measured) distance and $r_2$. Consequently:

$$(setup+r_1)/(r_1+spacer+r_2)=S_1/(S_1+S_2)$$

The relation obtained above from the similar triangles can be used to determine how the setup distance is related to the spacer 18 and the physical dimensions illustrated in FIG. 4. The resulting relationship is $$setup=[S_1/(S_1+S_2)](r_1)[r_2/r_1-S_2/S_1]+[S_1/(S_1+S_2)] (spacer)$$

It should be noted that if the physical dimensions of the locating post 13b and fence pivot 13a are chosen wisely, the term involving only the physical dimensions will not be needed: i. e. chose $$r_2/r_1=S_2/S_1$$

Using the above relation for the physical dimensions results in a simple relationship for the setup distance:

$$setup=[S_1/(S_1+S_2)] (spacer)$$

For example, if the pivot 13a is located one inch from the face of the fence 17, then, $r_1$ is 1 inch. If the locating post 13b and pivot 13a are centered at 15 inches on each side of the cutting tool center 15, on a line through the center 15 of the cutting tool, using a 1 inch radius locating post 13b, obtains a ratio of ½. Then, using the same fence 16 and table T, by adding two additional holes (not shown) for the fence pivot 13a, along the line through the center of the cutting tool, all of the ratios shown in Table 1 can be obtained.

TABLE 1

Required Dimensions to Obtain Various Ratios with the same Fence and Table

| Dimension/ratio | ½ | ⅓ | ¼ |
|---|---|---|---|
| Pivot Radius $r_1$ | 1 inch | 1 inch | 1 inch |
| Post Radius $r_2$ | 1 inch | 2 inch | 3 inch |
| Pivot Space $S_1$ | 15 inch | 7½ in. | 5 inch |
| Post Space $S_2$ | 15 inch | 15 inch | 15 inch |

It is interesting to note that one can mortise or groove a board at its center or at one fourth of its thickness (or width), or at one third of its thickness (or width). Using a 1" spacer, with a ratio of ⅓, would even let us cut a groove ⅓ inch from the edge.

Thus the pivoted fence with a locating post affords a simple and accurate method for centering work and setting up the fence for other cuts. However, the pivoted fence has a drawback when one wants to cut a blind rectangular mortise wider than the bit: when the fence is moved, any stop blocks being used would have to be adjusted to obtain the desired result. Also, if a work piece is held firmly against the fence and the fence is moved then the bit will cut an arc in the piece rather than a cut perpendicular to the edge that was held against the fence. As described in the next section, we have solved these problems with the concept of "fence centered motion".

Fence Centered Motion

The term fence centered motion, means that when the fence is moved, the fence is located so that the center of the fence lies on a line that is perpendicular to the fence and passes through the center of the bit. This can be accomplished by cutting a slot in the fence that replaces the fence pivot hole and by cutting a groove in the table that guides a follower (e.g. a peg) in the fence. Alternately, the peg can be attached to the table T and both a straight slot and a curved slot can be cut into the fence. The equations for the curve and the location of the peg are developed as follows.

Figure 5:
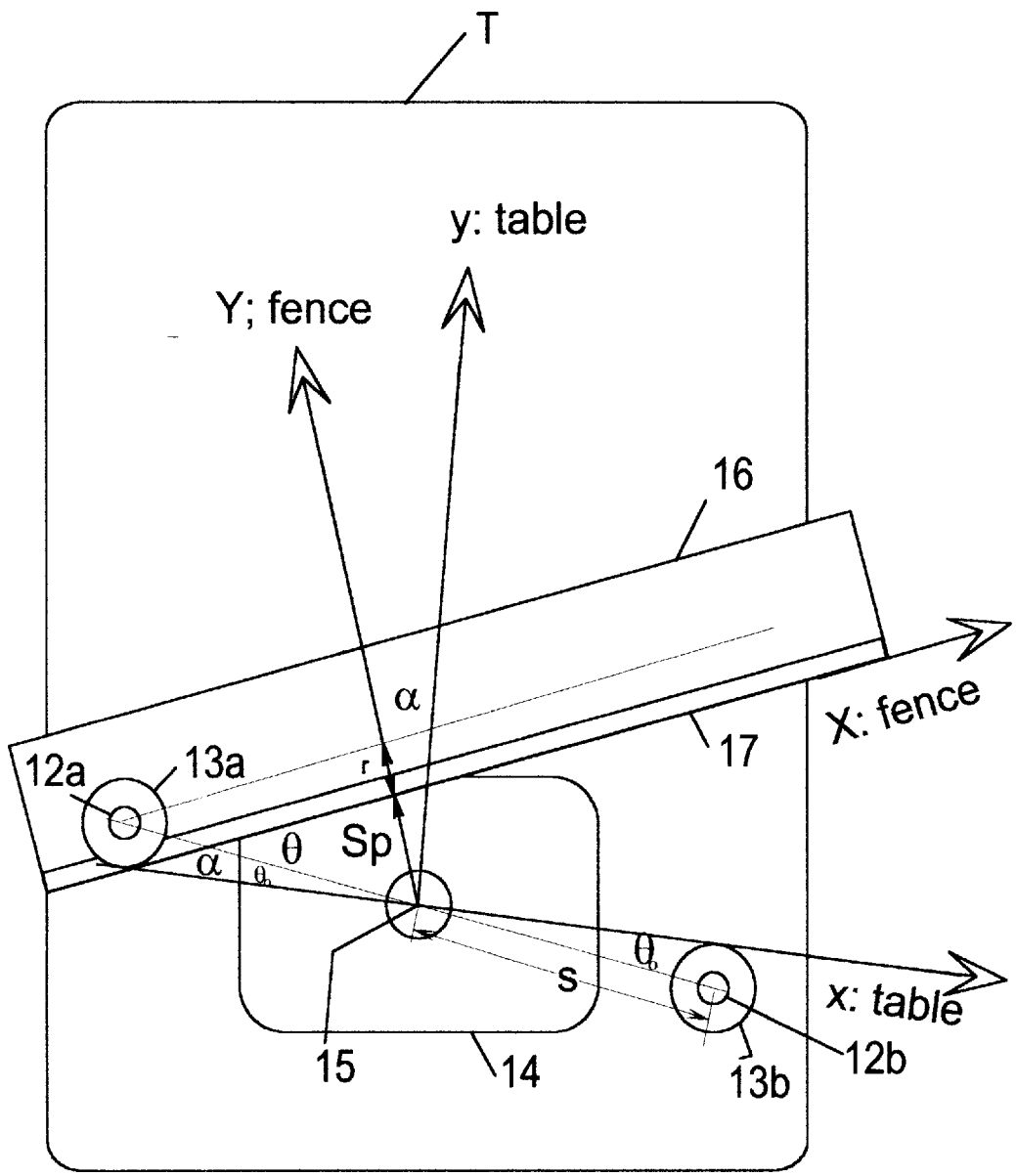
FIG. 5 illustrates the pivoted fence and post on a table as used to develop an equation for the cutting of a groove in the table (or fence) to receive a follower pin in the fence (or table), such that when the fence is moved over the table the center of the fence will always align with the center of the cutting tool.

FIG. 5 shows the table with the fence, 16, pivoted at some arbitrary angle, θ. Both the fence and the table coordinates are shown on FIG. 5. FIG. 5 also shows the angles and distances referred to in the descriptions of the equations in the following sections.

X and Y are the coordinates of a point on the fence which will trace a curve in table coordinates. Sp (see FIG. 5) is the perpendicular spacing of the fence face, 17, from the center of the router bit, 15, which is the origin of the table coordinates. When the spacing, Sp, is zero the origin of the fence and the table coincide. Lower case r is the location of the center of the fence pivot, 12a, from the face of the fence, 17, (likewise, r is the radius for the post 13b.) Lower case s is the spacing of the pivot holes, 12a and 12b, from the center of the router bit, 15, (11.09375 in the prototype table). The angle $\theta_0$ is between the fence face 17, and the diameter through the pivot holes, 12a and 12b, when the spacing, Sp., is zero.

$$Sp(\theta)=s[\sin(\theta(\pi/180)-r]$$

The angle θ above is between the fence face 17 and the diameter through pivot holes 2, at the fence position that gives the spacing Sp.

$$\alpha(\theta)=\pi/180(\theta)-\theta o(r)$$

The angle α, above, is between the face of the fence, 17, and the x axis of the table (the line tangent to both posts 13a and 13b).

$$X(x,\theta)=y \sin(\alpha(\theta))+x \cos(\alpha(\theta))$$

$$Y(x,\theta)=y \cos(\alpha(\theta))-x \sin(\alpha(\theta))-Sp(\theta)$$

Figure 6:
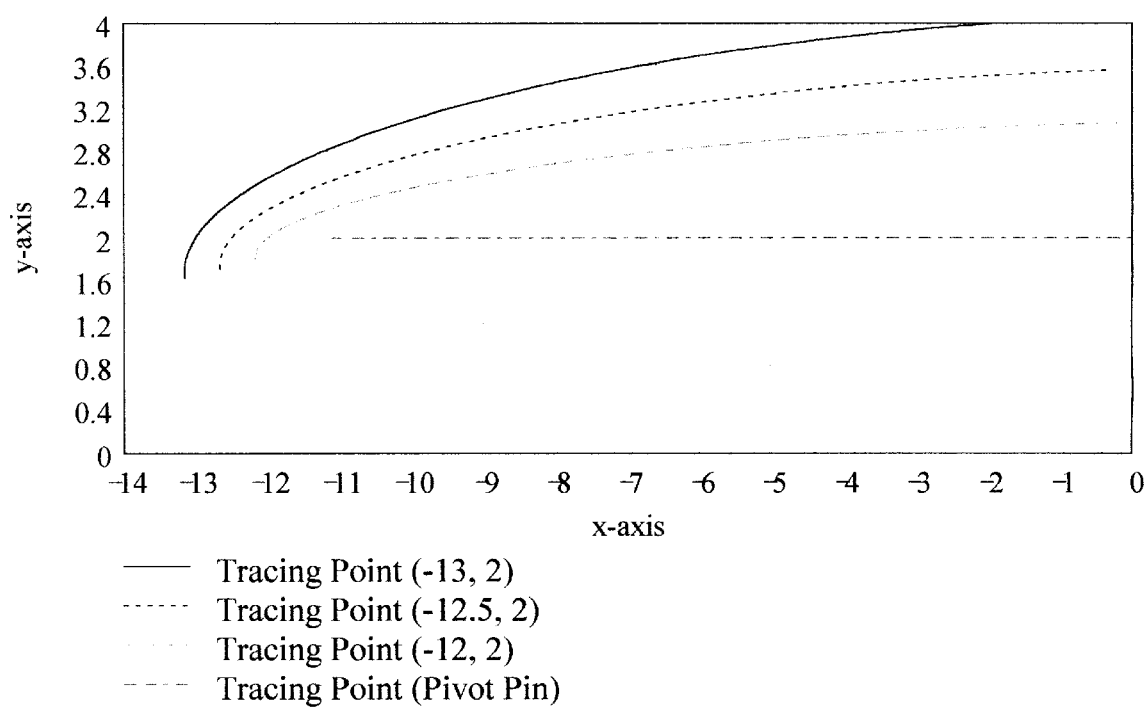
FIG. 6 is a diagram illustrating the development of curves which define the shape of a slot, as in the fence base, to receive a follower in the table top and achieve fence centered motion of the fence with respect to the cutting tool.

The above two equations give the trace of the point x, y that is fixed to the table, on the fence. (the values of X and Y are in fence coordinates.) as a function of the parameter θ. FIG. 6 shows such curves for y=r and example values of x as indicated on FIG. 6: the tracing points are located in table coordinates at: (−13, 2), (−12.5, 2), (−12, 2) and at the fence pivot point. If a slot is cut into the fence along the pivot point trace then the fence can pivot and be moved along the slot to align the center (the origin in fence coordinates) of the fence with the bit (the center of the bit, 15, and the origin of the fence lie on a line perpendicular to the fence face.) If a groove is, also, cut into the fence along one of the other traces and a follower located in the table at the tracing point, then when the fence is mounted to the table and it is moved the center of the fence will always align with the center of the bit.

If X and Y are the fence coordinates of a point fixed on the fence. then the trace of the point X,Y (fixed to the fence) on the table (x and y are in table coordinates) is given as:

$$x(X,\theta)=X \cos(\alpha(\theta))-(Sp(\theta)+Y) \sin(\alpha(\theta))$$

$$y(X,\theta)=X \sin(\alpha(\theta))+(Sp(\theta)+Y) \cos(\alpha(\theta))$$

Figure 7:
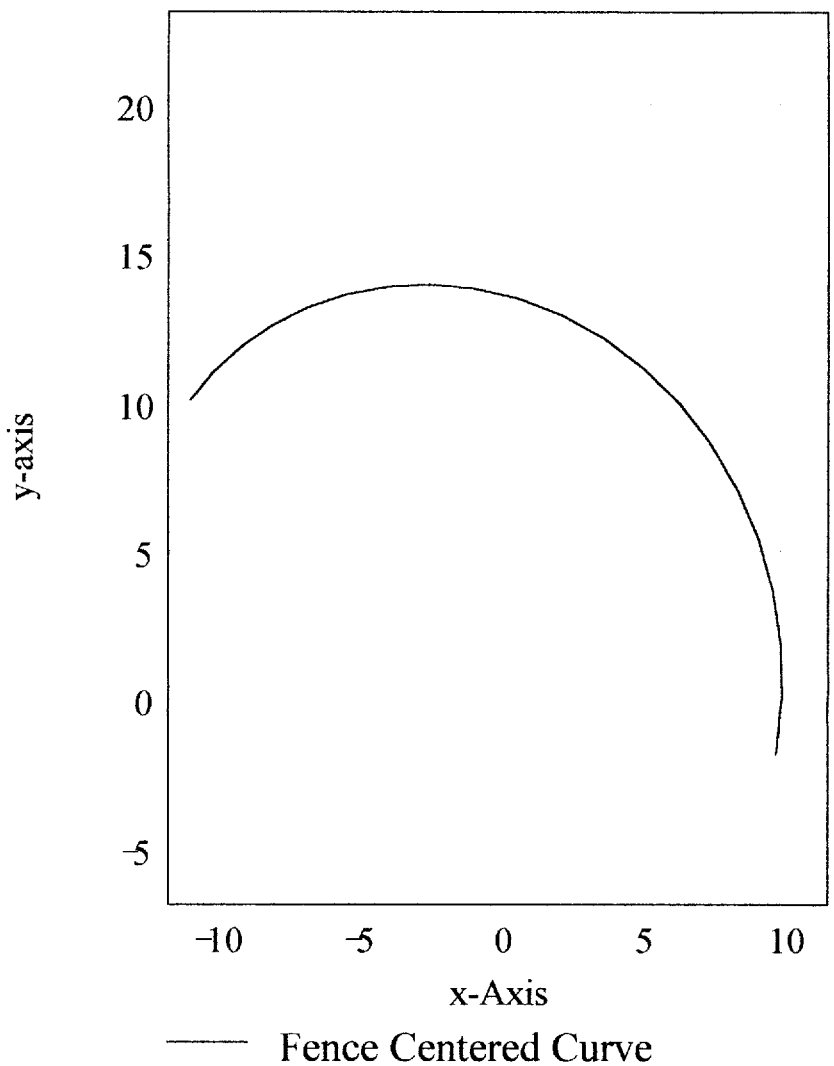
FIG. 7 is a diagrammatic expression of the shape of such a slot cut in the table top, to receive a follower in the fence and achieve fence centered motion of the fence with respect to the cutting tool.

Thus, an alternate approach is to cut the trace into the table as shown in FIG. 7. The follower is then placed in the fence at the proper point (here at (10, 2) as in the prototype table) and again the fence (with a straight slot as above) can be moved and the center automatically aligned with the bit.

Figure 8:
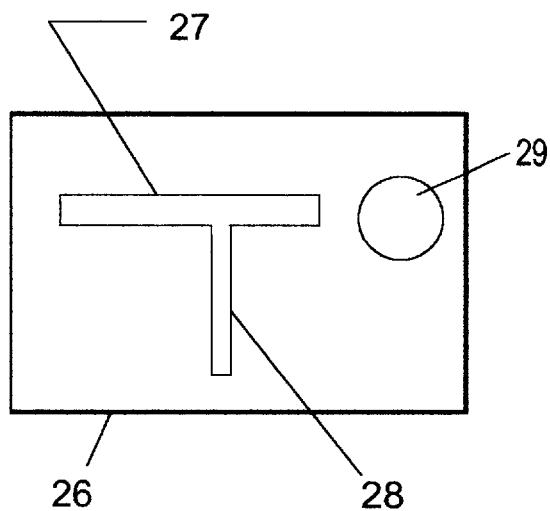
FIG. 8 is an illustration of a jig for cutting (routing) a fence centered motion curve into the table.

The equations given above can be used in computer controlled equipment used in the manufacture of the tables. However, a simple jig has been developed which allows cutting of the required curve into the table using a router. FIG. 8 shows a schematic of the jig used to cut the curve into the prototype table. The two slots are perpendicular and the router bit is mounted on the jig at the same relative position as the follower pin will be at, on the fence. The pivot pin of the fence is placed through the slot, 27, and into the pivot hole in the table and the router bit of the router mounted in the table (not used to cut the curve) is inserted into the slot, 28, in FIG. 5. When the router is mounted on the jig and is moved while running, it cuts the required curve for fence centered motion into the table.

Figure 9:
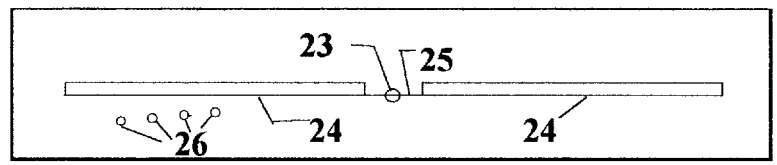
FIG. 9 is an illustration of a jig for pivot hole layout on the table.

Also, a simple jig was developed for layout of the pivot holes, as shown in FIG. 9. As an example, a ¼ inch hole, 23, in the jig is positioned over a ¼ inch rod or bit mounted in the router. The jig is rotated to the desired position and clamped to the table. Using the bottom edge of the slots, 24, two lines are drawn. These lines, if extended, would pass through the center of the cutting tool. The clamp is removed and the jig is allowed to rotate about the bit center. One of the holes, 26, provided in the jig is then used to swing an arc across each of the line segments: the intersection of the arcs with the lines precisely locate the centers of the pivot hole for the fence and the locating post.

The simple jigs, shown in FIGS. 8 and 9, can be provided in kits, along with instructions, that would allow a user to make, or upgrade, a table in the user's own workshop. In addition to the fixed table applications, so far discussed, there are numerous applications of the concept for portable tools such as drills and routers (not table mounted). Some of these are discussed in the next section.

Portable Power Tool Applications

Figure 10:
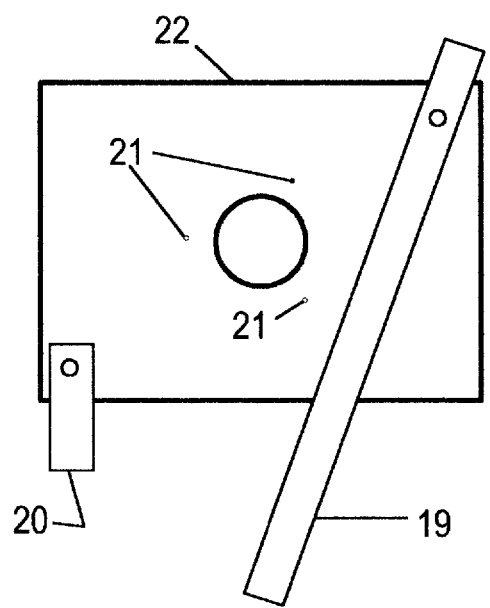
FIG. 10 is an illustration of a router baseplate fitted with a pivoted fence and locating post.
Figure 11:
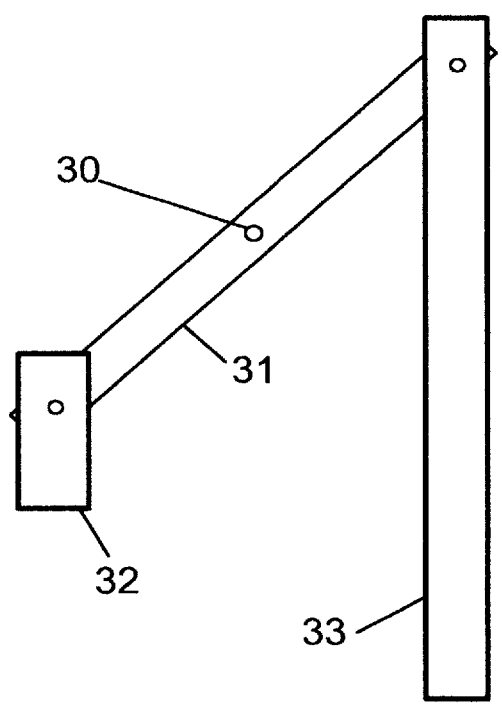
FIG. 11 illustrates use of the pivoted fence and locating post as a drilling and marking jig.

A router baseplate can be equipped with a pivoted fence with locating post for use in portable applications, as shown in FIG. 10. Thus, the centering feature and ease of setup afforded by the pivoted fence with locating post will be available for portable applications. The locating post can be equipped with measurement means for those applications that do not require centering, just as in the table mounted case.

It should be pointed out that the pivoted fence with locating post avoids the limitations of both work piece size and mortise location that a traditional baseplate with two pins, centered about the bit, experiences: the work piece must be long enough to permit both pins to contact opposite sides of the work piece for the entire length of the cut. Further, irrespective of the length, the cuts cannot be made close to either end of the work piece, since, both pins must stay in contact with the work piece for the entire length of the cut. Even through it may be possible to work around these limitations it is not necessary with the pivoted fence with locating post. Neither of the limitations apply to the pivoted fence with locating post, since, once set up the work piece rides against the fence and, therefore, can be machined from one end to the other regardless of the length of the work piece.

The pivoted fence with locating post can also be used with portable drills. The pivoted fence and locating post can be attached to the bottom of a drill fixture, used for drilling holes vertically or at a set, fixed angle. Both the self centering feature and the locating feature can be used for vertical drilling. An alternate approach is to use the pivoted fence with locating post as a self centering jig with means for attaching drill bushings or marking tools at the center of the jig, as shown in FIG. 10. After the fence is located at the desired distance, the fence is locked in place and the post removed. Thus, the bushing or marking tool is located precisely relative to the fence and as many holes as desired can be drilled, or a straight line can be marked on the work piece. Means (not shown) can be attached to the bushing to allow for evenly spaced holes: e.g. a holder, with a pin equal to the bit diameter, could be pivoted around the bushing and used to locate the jig for the next hole.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A fence mechanism providing rapid and simplified settings of a fence member with respect to the center of a rotary cutting tool, in which the cutting tool is mounted to rotate in line with a center point in a base member, a base member having a center point providing a reference to the rotational axis of the cutting tool, a fence member extending at least partially across said base member past said center point a stop member to one side of said aperture for providing a rest which a first portion of the fence can contact for positioning, a pivot connection between said fence member and said base member located on said fence member at the opposite side of said aperture from said stop member such that said fence member can be swung about said pivot connection into contact with said stop member with a central portion of said fence member intersecting the axis of rotation of the cutting tool, whereby movement of said first portion of said fence member a predetermined distance away from said stop member will cause said central portion of said fence member to locate at a predetermined spacing from the tool axis of rotation so workpieces can be guided with respect to the rotating tool as the workpiece and tool are moved relative to each other.

2. A fence mechanism as defined in claim 1, wherein said base member is a base plate of a portable tool and said fence member is attached to said base plate.

3. A fence mechanism as defined in claim 1, wherein said base member is a table having an upper surface with said center point thereon and to which the rotary cutting tool is aligned, and said fence member is mounted to the upper surface of said table.

4. A fence mechanism as defined in claim 3, wherein said table upper surface includes a curved slot located with respect to said stop member and said center point, said fence member having a straight slot therein and said fence member pivot connection is fixed to said table surface and has a sliding connection to said straight slot, a curved slot formed in said table surface, and a follower on said fence member which tracks along said curved slot.

5. A fence mechanism as defined in claim 1, wherein measuring means are associated with said stop member to provide precise spacing of said stop member and said first portion of said fence member, thereby to provide precise spacing between said central portion of said fence member and the rotary cutter regardless of the presence and/or size of the rotary cutter.

6. A fence mechanism as defined in claim 1, wherein said stop member includes a disc for contacting said first portion of said fence member.

7. For use with a rotary cutting tool mounted to rotate in an aperture in a base member, a fence mechanism for setting the position of a fence member with respect to the center of the rotary cutting tool, comprising a base member having a central aperture providing a surrounding through which the cutting tool can project, a fence member extending perpendicularly to and at least partially across said base member past said aperture, a stop member to one side of said aperture for providing a rest which a first portion of the fence can contact for positioning, a pivot connection between said fence member and said base member located on said fence member at the opposite side of said aperture from said stop member such that said fence member can be swung about said pivot connection into contact with said stop member with a central portion of said fence member extending across said aperture and intersecting the axis of rotation of a cutting tool when mounted, whereby movement of said first portion of said fence member a predetermined distance away from said stop member will cause said central portion of said fence member to locate at a predetermined spacing from the tool axis of rotation so workpieces can be guided with respect to the rotating tool as the workpiece and tool are moved relative to each other.

8. A fence mechanism as defined in claim 7, wherein said base member is a base plate of a portable tool and said fence member is attached to said base plate.

9. A fence mechanism as defined in claim 7, wherein said table upper surface includes a curved slot located with respect to said stop member and said aperture, said fence meber having a straight slot therein and said fence member pivot connection is fixed to said table surface and has a sliding connection to said straight slot, a curved slot formed in said table surface, and a follower on said fence member which tracks along said curved slot.

10. A fence mechanism as defined in claim 9, wherein said table upper surface includes a curved slot located with respect to said stop member and said aperture and said fence member pivot connection is a follower on said fence member which tracks along said slot.

11. The method of setting the position of a fence member with respect to the center of a rotary cutting tool mounted to rotate in an aperture in a base member, comprising mounting a fence member extending perpendicularly to and at least partially across the base member and past the aperture, locating a stop member to one side of the aperture providing a rest which a first portion of the fence can contact for positioning, providing a pivot connection between the fence member and the base member which is located on the fence member at the opposite side of the aperture from the stop member such that the fence member can be swung about the pivot connection into contact with the stop member, thus locating a central portion of the fence member extending across the aperture and intersecting the axis of rotation for a cutting tool, moving the first portion of the fence member a predetermined distance away from the stop member to cause the central portion of the fence member to locate at a predetermined spacing from the tool axis of rotation so workpieces can be guided with respect to the rotating tool as the workpiece and tool are moved relative to each other.

* * * * *